United States Patent [19]

Haarasilta et al.

[11] Patent Number: 4,990,343
[45] Date of Patent: Feb. 5, 1991

[54] ENZYME PRODUCT AND METHOD OF IMPROVING THE PROPERTIES OF DOUGH AND THE QUALITY OF BREAD

[75] Inventors: Sampsa Haarasilta, Kerava; Timo Pullinen, Vantaa; Seppo Vaisanen, Kerava; Ina Tammersalo-Karsten, Espoo, all of Finland

[73] Assignee: Cultor Ltd., Helsinki, Finland

[21] Appl. No.: 341,389

[22] Filed: Apr. 21, 1989

[30] Foreign Application Priority Data

Apr. 22, 1988 [FI] Finland ................................. 881905
Jan. 3, 1989 [FI] Finland ................................. 890021

[51] Int. Cl.$^5$ ............................................. A21D 8/04
[52] U.S. Cl. ........................................ 426/10; 426/28; 426/20; 426/61
[58] Field of Search .................... 426/10, 20, 28, 61

[56] References Cited

U.S. PATENT DOCUMENTS 2,783,150 2/1957 Luther ................................... 426/61
3,512,992 5/1970 Cooke et al. ......................... 426/20
4,803,084 2/1989 Shine .................................... 426/20

FOREIGN PATENT DOCUMENTS 0132289 1/1985 European Pat. Off. .
1216556 12/1970 United Kingdom .

OTHER PUBLICATIONS

Vol. 71, Chemical Abstracts, No. 11, 11/24/67, No. 100606K.
Vol. 71, Chemical Abstracts, No. 11, 11/24/67, No. 100606M.

Primary Examiner—Donald E. Czaja
Assistant Examiner—Helen Pratt
Attorney, Agent, or Firm—Baker & McKenzie

[57] ABSTRACT

The invention relates to a method of improving the properties of dough and the quality of bread by adding to the dough, dough ingredients, ingredient mixture or dough additives or additive mixture an enzyme preparation comprising hemicellulose and/or cellulose degrading enzymes and glucose oxidase, or sulphydryl oxidase and glucose oxidase, the enzyme preparation being preferably used in combination with lecithin. The enzyme preparation of the invention has an advantageous effect on the processability of the dough and the properties of the final bakery product. The combination of the enzyme preparation of the invention and lecithin can advantageously replace bromate conventionally used as a baking additive.

20 Claims, No Drawings

ENZYME PRODUCT AND METHOD OF IMPROVING THE PROPERTIES OF DOUGH AND THE QUALITY OF BREAD

FIELD OF THE INVENTION

This invention relates to a method for improving the rheological properties of a flour dough which comprises combining flour, yeast, water and an effective amount of an enzyme preparation comprising hemicellulose and/or cellulose degrading enzymes and glucose oxidase, and optionally including sulfhydryl oxidase and mixing said ingredients to form a suitable baking dough. The invention also relates to a baking premix which comprises flour, an enzyme preparation and a suitable carrier. The invention results in stronger doughs, with improved rheological properties as well as a final baked product with improved qualities.

BACKGROUND OF THE INVENTION

Cellulases/hemicellulases cleave non-starch polysaccharides contained in flour. This affects the water retention and water binding capacity, viscosity, and proofing (rising) capacity of the dough as well as the texture, aroma, taste and freshness of the bead.

Generally speaking, the use of cellulases/hemicellulases gives an improved oven spring to the dough and an improved bread volume, grain structure and anti-staling properties to the finished bakery product. However, the dough may become too slack and stickier, which may cause problems. It is thereby necessary to use dosages too low for an optimum baking result to be achieved, so that the enzymes in question cannot be utilized to the full extent. At low dose levels, cellulases/hemicellulases make the mechanical handling of the dough easier whereas the effect of cellulases/hemicellulases on the process tolerance, for instance, may be insufficient when used alone, wherefore emulsifiers have to be used as additives.

It has been found that the addition of glucose oxidase (GO) and sulfhydryl oxidase (SHX) strengthens the dough. Flour having a low protein content is usually classified as weak. The gluten of weak flour (the extensible, rubbery mass formed when mixing flour with water) is very extensible under stress but does not return to its original dimensions when the stress is removed. Flour with a high protein content is classified as strong. The gluten of strong flour is less extensible than that of weak flour. It is more resistant to mixing.

Strong flour is often preferred for baking purposes, since the rheological and handling properties of a dough prepared from such flour are superior to those obtained with weak flour. In addition, the shape and texture of a bakery product prepared from strong flour are remarkably better as compared with weak flour.

A dough prepared from strong flour is also more stable as compared with that prepared from weak flour. This is one of the most important—if not the most important—properties in view of the baking process.

In addition to those mentioned above, enzymes affecting baking further include amylases and proteases. Amylases produce sugars for yeast food (from damaged starch, for instance). Alpha-amylase breaks down such starch into dextrines which are further broken down by beta-amylases into maltose. Due to this, an increased amount of gas is produced by the yeast, which increases the bread volume. At the same time, the increased formation of dextrines and maltose improves the crust color, aroma and taste of the final product. Furthermore, alpha-amylase retards the chemical ageing of bread (staling of the bread crumb). Proteases, in turn, break down flour proteins, resulting in a more stretchy dough. The dough "matures" more rapidly whereby the need of mixing and the fermentation times of the dough can be decreased; due to the better baking properties, the gas retention of the dough, and the volume and grain structure of the bread are improved.

It has been known for a long time to use so-called bread improvers in the preparation of dough. The function of such bread improvers, including emulsifiers, unspecific oxidants (such as ascorbic acid (dehydroascorbic acid), potassium bromate, peroxides, iodates, etc.) etc., is to form inter-protein bonds which strengthen the dough.

Emulsifiers used in baking have many effects, such as retardation of chemical ageing, strengthening of gluten and an even emulsification of fat through the dough. Conventional emulsifiers used in baking include monoglycerides, diacetyl tartaric acid esters of mono- and diglycerides of fatty acids, and lecithins. Lecithin used in baking is normally obtained from soya. Lecithin may be in many different product forms, such as raw lecithin, de-oiled lecithin, or a carrier spray-dried lecithin, fractionated lecithin, chemically modified and enzymatically modified lecithin. Lecithin is a mixture of different phospholipides, the composition of which is variable. Furthermore, the different product types and commercial products behave in different ways in baking applications. Normally the lecithin content of commercial products is specified as acetone insoluble material (AI). Following commercial product examples from Lucas Meyer, Hamburg, Germany, illustrate the range of products: Emulpur N (de-oiled), phospholipide content min 95%, Lecimulthin M-035 (spray-dried), phospholipide content appr. 28.0%. In addition to its emulsifying effect, lecithin improves the baking properties of the other baking ingredients, increases bread volume, improves anti-staling properties and has a favorable effect on the crumb and crust texture.

Many commonly used bread improvers have disadvantageous effects; in particular, they may have negative organoleptic effects on the final bakery product. On the other hand, the use of bromate, e.g., is not accepted in many countries.

From the consumer's point of view, it is advantageous to minimize the use of the above-mentioned chemical additives.

U.S. Pat. No. 2,783,150 discloses a method of treating flours with glucose oxidase enzyme for improving the dough formation and baking properties. This results in improved dough strength, improved dough handling properties, and improved texture and appearance of the baked product. The use of glucose oxidase in combination with ascorbic acid is recited as particularly advantageous.

Japanese Patent Specification No. 5701/1968 discloses a method of improving the quality of bread by the addition of an enzyme composition containing cellulase and/or hemicellulase to the dough. It is emphasized in the patent specification that the addition of this enzyme composition causes decomposition of insoluble fibrous components contained in flour, such as cellulose and pentosan which as such would considerably deteriorate the quality of bread by rendering the dough non-homogeneous and by preventing the formation of gluten. It is recited that the bread product so obtained has an increased volume, more uniform grain structure and slower ageing during storage.

U.S. Pat. No. 136,003, filed in December 1987, describes the use of an enzyme preparation containing glucose oxidase and microbiological sulfhydryl oxidase for increasing the strength of a dough prepared from flour, water and yeast. Such an enzyme preparation is recited to improve the rheological properties of the dough and, in particular, to improve the stability of the dough.

The combination of glucose oxidase and sulfhydryl oxidase has also been shown to dry the surface of dough, which improves the machinability of the dough.

It has now been unexpectedly found that the combined use of hemicellulase/cellulase and glucose oxidase enzymes, or glucose oxidase and sulfhydryl oxidase enzymes has a complementary synergistic effect, so that the processability and process tolerance, oven spring, volume and texture are clearly better than what could be expected when using each one of these enzymes alone.

The invention relates to a method of improving the rheological properties of flour dough and the properties of the final bakery product by adding to the dough an effective amount of an enzyme preparation containing hemicellulose and/or cellulase and glucose oxidase, or glucose oxidase and sulfhydryl oxidase. By the use of this enzyme composition, a dough prepared from weak flour will have the typical advantageous properties of a dough prepared from strong flour (advantageous rheological properties and "good gluten properties", handling properties and tolerance in a mechanized industrial bread making process) while the final bakery product keeps its desired shape, has good volume, good grain structure and good organoleptic properties. The enzyme composition of the invention can also either partially or fully replace conventional bread improves classified as additives (e.g., emulsifiers). The surface of a dough containing the enzyme preparation of the invention remains dry, which is an important factor in industrial processes.

SUMMARY OF THE INVENTION

The present invention contemplates a method for improving the rheological properties of flour dough and the quality of the baked product produced therefrom which comprises combining flour, yeast and water with an effective amount of an enzyme preparation comprising hemicellulose and/or cellulose degrading enzymes and glucose oxidase and mixing said ingredients to form a suitable baking dough. The resulting dough exhibits improved strength and rheological properties. The enzyme preparation may, in addition, contain sulfhydryl oxidase.

Preferably, the enzyme preparation contains between about 0 and about 50,000 Units of a hemicellulose degrading enzyme, about 0 to about 50,000 Units of cellulase, and about 5 to about 2,500 Units of glucose oxidase per kilogram of flour. An enzyme preparation which contains about 10 to about 10,000 Units of a hemicellulose degrading enzyme, about 10 to about 10,000 Units of cellulase and about 35 to about 1,000 Units of glucose oxidase is particularly preferred. The present invention also contemplates a dough conditioner wherein the ratio of the hemicellulose degrading enzyme to cellulase (based on Units of enzyme present) is about 1, and a dough conditioner wherein the ratio of the hemicellulose and cellulose degrading enzymes to glucose oxidase is about 0.3 to about 10.

If sulfhydryl oxidase is present, the enzyme preparation preferably contains between about 0 and about 50,000 Units of hemicellulose degrading enzyme, about 0 to about 50,000 Units of cellulase, about 5 to about 2,500 Units of glucose oxidase and about 0 to about 800 Units of sulfhydryl oxidase per kilogram of flour. An enzyme preparation which contains between about 10 to about 10,000 Units of a hemicellulose degrading enzyme, about 10 to about 10,000 Units of cellulase, about 35 to about 1,000 Units of glucose oxidase and about 0 to about 300 Units of sulfhydryl oxidase is particularly preferred.

The method of the present invention can be used with commonly used dough preparation processes, such as the straight dough process, the sour dough process, the Chorleywood bread process and the sponge and dough process. The method of the present invention can be used to manufacture bread as well as sweeten products such as cakes.

The method of the present invention also contemplates the use of lecithin in combination with the enzyme preparation. Lecithin added in the amount of between about 0.1% to about 1.1% by weight is preferred, with lecithin added in an amount of between about 0.2% to about 0.8% being particularly preferred.

The method of the present invention also contemplates the use of a combination of flour with an effective amount of an enzyme preparation comprising hemicellulose and/or cellulose degrading enzymes and glucose oxidase along with a suitable carrier to form a dough premix. Optionally, such dough premix could include sulfhydryl oxidase and/or lecithin.

Finally, the present invention contemplates an enzyme preparation which improves the rheological properties of dough and the characteristics of a baked product made therefrom which comprises hemicellulose and/or cellulose degrading enzymes and glucose oxidase and optionally including sulfhydryl oxidase.

DETAILED DESCRIPTION OF THE PREFERRED EMBODIMENT

A. General

The dough is prepared by mixing together flour, water, yeast, the enzyme composition of the invention and other possible ingredients and additives. The enzyme preparation can be added together with any dough ingredient or ingredient mixture or any additive or additive mixture, except strong chemicals which inactivate the enzymes. The dough can be prepared by any dough preparation process common in the baking industry and known to those skilled in the art, such as a normal straight dough process, a sour dough process, the "Chorleywood Bread Process", and the "Sponge and Dough" process. Wheat flour is preferably used but it is also possible to use, e.g., rye flours and other flours and their mixtures. The enzyme preparation of the invention can also be used in the preparation of dry grain products, such as ryecrisp and rusk.

The enzyme preparation comprises about 0–50,000 units, preferably 10–10,000 Units of hemicellulolytic activity (calculated as xylanase units); about 0–50,000 Units, preferably 10–10,000 Units of cellulolytic activity (calculated as carboxymethyl cellulase Units); about 5–2,500, preferably 35–1,000 Units of glucose oxidase; and about 0–800, preferably 0–300 Units of sulfhydryl oxidase calculated per kg of flour; the Units for each enzyme will be defined supra. The preferred amounts of enzymes depend on the process used, the process conditions, and the ingredients. An example of an enzyme preparation useful in direct baking would be as follows: 300 Units of hemicellulose degrading enzyme, 100 Units of cellulase, 300 Units of glucose oxidase, and 1 unit of sulfhydryl oxidase per kg of flours. Enzyme preparations useful in Chorleywood baking include a preparation containing about 2,000 Units of hemicellulose, about 700 Units of cellulase, about 650 Units of glucose oxidase, and about 2.5 Units of sulfhydryl oxidase.

Any method known from the prior art can be used in the preparation of the enzymes. Hemicellulolytic and cellulolytic enzymes can be prepared microbiologically by means of fungi or bacteria, e.g., molds belonging to the Trichoderma, Aspergillus or Penicillium genus, in a manner known per se. Sulfhydryl oxidase and glucose oxidase can be prepared microbiologically by means of fungi and bacteria, e.g., molds belonging to the Aspergillus or Penicillium genus.

The hemicellulolytic and cellulolytic activities of the enzyme preparations of the invention are defined as xylanase (Xyl.), carboxymethyl cellulase (CMC) and/or filter paper (FP) activities.

The definitions of the different enzyme activities and the methods of defining the enzyme activities are set forth below:

Xylanase activity (Khan A. W. et al., Enzyme Microb. Technol. 8 (1986) 373-377):

1 ml of a suitably diluted enzyme solution in acetate buffer (0.05M NaAc, pH 5.3) is tempered at 50 C. 1 ml of xylan substrate (1% xylan, 0.05 NaAc, pH 5.3) is added. The sample is incubated for 30 min at 50° C. The reaction is stopped by adding 3 ml of DNS reagent (3,5-dinitrosalicylate), and the color is developed by boiling the sample mixture for 5 min. The absorbance is measured at 540 nm. One enzyme unit liberates 1 micromole of reducing sugars per one minute under assay conditions, calculated as glucose.

Filter paper activity (Ghose T. K. et al., Symposium of Enzymatic Hydrolysis of Cellulose, Bailey M., Enari T. M., Linko M., Eds. (SITRA, Aulanko, Finland, 1975), p. 111-136):

A piece of filter paper (Whatman 1, 50 mg) is added to 1 ml of acetate buffer (0.05M NaAc, pH 4.8). 1 ml of suitably diluted enzyme solution is added. The solution is incubated for 1 h at 50° C. The reaction is stopped by adding 3 ml of DNS reagent, and the color is developed and measured similarly as in the xylanase determination. One activity unit liberates 1 micromole of reducing sugars per one minute under assay conditions, calculated as glucose.

Carboxymethyl cellulase activity (Mandels M., Weber J., Adv. Chem Ser. 95 (1969) 391-413):

1 ml of suitably diluted enzyme solution in acetate buffer (0.05M NaAc, pH 4.8) and 1 ml of CMC substrate (1% CMC, 0.05M NaAc, pH 4.8) are mixed together. The solution is incubated for 10 min at 50° C. The reaction is stopped by adding 3 ml of DNS reagent. One enzyme unit liberates 1 micromole of reducing sugars calculated as glucose per one minute, under assay conditions.

Sulfhydryl oxidase activity (Young J. and Nimmo I., Biochem. J. 103 (1972) 33):

One sulfhydryl oxidase unit is equal to an enzyme amount required for depleting 1 micromole of o2 per one minute from a test mixture containing 8 mmol of GSH (reduced glutathione) and 40 mmol of sodium acetate (pH 5.5) at 25° C.

Glucose oxidase activity (Scott D., J. Agr. Food. Chem. 1 (1953) 727):

3 units of glucose oxidase yields 1 ml of 0.05N gluconic acid.

The enzyme preparation of the invention may contain cellulases and/or hemicellulases functioning both with endo- and exomechanisms. In addition to these enzyme activities, the enzyme preparation to be used according to the invention may contain substantial amounts e.g. of the following enzyme activities: beta-glucosidase, beta-xylosidase, acetyl esterase, arabinase, mannanase, galactomannanase, pectinase, alpha-arabinosidase, alpha-glucuronidase, alpha-amylase, beta-amylase, glucoamylase and protease.

EXAMPLE 1

Preparations of Pan White Bread

Baking tests were carried out in which two different types of enzyme preparations containing hemicellulolytic and cellulolytic activity (preparations A and B), enzyme preparation containing glucose oxidase and sulfhydryl oxidase (preparation C), and enzyme preparation of the invention containing cellulolytic and hemicellulolytic activity and glucose oxidase and sulfhydryl oxidase (preparation D) were added to a pan bread dough.

The enzyme activities of the enzyme preparations to be tested appear from the following Table 1, whereby xylanase(Xyl.), carboxymethyl cellulase(CMC) and filter paper (FP) activities are descriptive of the hemicellulolytic and cellulolytic activity of the enzyme preparations (preparations A and B)). Preparation C contains glucose oxidase and sulfhydryl oxidase, and preparation D of the invention contains glucose oxidase (GO) and sulfhydryl oxidase (SHX) in addition to the above-mentioned cellulolytic and hemicellulolytic activities.

TABLE 1

Enzyme Activity of Preparations Used to Bake White Bread

| Preparation | Dosage of Flour (mg/kg) | Enzyme activity of flour (U/kg) | | | | |
|---|---|---|---|---|---|---|
| | | Xyl. | CMC | FP | GO | SHX |
| A. Control 1 | 1. 12.95 | 350 | 120 | 5 | — | — |
| (cellulase + | 2. 25.90 | 700 | 240 | 10 | — | — |
| hemicellulase) | 3. 37.00 | 1,000 | 340 | 14 | — | — |
| | 4. 74.00 | 2,000 | 680 | 28 | — | — |
| B. Control 2 | 1. 40 | 20 | 165 | 14 | — | — |
| (cellulase + | 2. 80 | 40 | 330 | 29 | — | — |
| hemicellulase) | 3. 160 | 80 | 660 | 58 | — | — |
| C. Glucose oxi- | 1. 0.8 | — | — | — | 100 | 0.4 |
| dase + | 2. 2.4 | — | — | — | 300 | 1.2 |
| sulphydryl oxidase | 3. 4.8 | — | — | — | 600 | 2.4 |
| D. Combination: | 1. 37/2.5 | 1,000 | 340 | 14 | 320 | 1.3 |
| cellulase + | 2. 37/5 | 1,000 | 340 | 14 | 645 | 2.6 |
| hemicellulase + | 3. 74/2.5 | 2,000 | 680 | 28 | 320 | 1.3 |
| glucose oxidase + sulphydryl oxidase | 4. 74/5.0 | 2,000 | 680 | 28 | 645 | 2.6 |

Flour used in the test bakes possessed the following properties (percentages given are by weight):

| | |
|---|---|
| Moisture (%) | 14.7 |
| Protein content (Kjeldahl) (%) | 11.3 |

| | |
|---|---|
| Concentration of damaged starch (Farrand units) | 28 |
| Alpha-amylase content (Farrand units) | 2 |
| Color of flour | 3.3 |
| Falling number (5 g) | 218 |
| Water bind in 10 min (% on flour) | 58.6 |

Composition of the dough in the test bakes was as follows (amounts are percentages on the amount of flour):

| | |
|---|---|
| Flour | 100 |
| Yeast | 2.1 |
| Salt | 1.8 |
| Fat | 0.7 |
| Water | 58.6 |
| Ascorbic acid | 0.003 |
| Potassium bromate | 0.0045 |
| Enzyme additions (see Table 1) | |

Flour, salt, ascorbic acid and bromate were weighed and stored at constant temperature (21° C.) overnight. Each enzyme preparation was dissolved in water at a desired concentration before each test series. A dough was prepared by the Chorleywood Bread Process, whereby each dough batch contained 1,400 g of flour. The flour was first introduced into a mixing bowl, whereafter, the other dry ingredients were added. The enzyme solution was dispersed through the dough water, and the resultant solution was added to the dough. The dough was prepared as follows: mixing (Morton Kopp mixing device, mixing speed 300 rev/min), scaling and first moulding, first proof (10 min), final moulding, final proof at 43° C. (proof height 10 cm), and baking at 230° C. for 25 min. Thereafter the loaves were allowed to cool, and they were stored overnight in a closed space at constant temperature (21° C.), whereafter the bread volume was determined by the rapeseed displacement, and other desired properties were determined.

The obtained results appear from Table 2 for the enzyme preparations A, B, C and D.

Each baking test was carried out as a parallel test in triplicate, and the evaluation of the loaves is given as the mean value of the results obtained for 3×4 loaves (same enzyme, same concentration).

TABLE 2

| Enzyme preparation | m | K | t | h | V | V | R |
|---|---|---|---|---|---|---|---|
| A | Control | good | 50 | 1.8 | 1349 | — | 8 |
| | 12.95 | good | 49 | 2.0 | 1363 | +1.0 | 8 |
| | 25.9 | good | 50 | 2.0 | 1375 | +1.9 | 8 |
| | 37.0 | good | 50 | 2.2 | 1415 | +4.9 | 7.3 |
| | 74.0 | very good | 51 | 2.3 | 1434 | +6.3 | 7.6 |
| B | Control | good | 50 | 1.8 | 1349 | — | 8 |
| | 40 | smooth* | 50 | 2.2 | 1399 | +3.7 | 8.3 |
| | 80 | smooth* | 49 | 2.0 | 1386 | +2.7 | 8.3 |
| | 160 | very good | 50 | 2.2 | 1424 | +5.6 | 8.6 |
| C | Control | good | 47 | 1.6 | 1332 | — | 7.3 |
| | 0.8 | good | 47 | 1.5 | 1321 | −0.8 | 7.3 |

TABLE 2-continued

| Enzyme preparation | m | K | t | h | V | V | R |
|---|---|---|---|---|---|---|---|
| | 2.4 | good | 47 | 1.5 | 1306 | −2.0 | 7.6 |
| | 4.8 | very good | 46 | 1.8 | 1334 | +0.2 | 7.6 |
| D | Control | good | 47 | 1.6 | 1332 | — | 7.3 |
| | 39.5 | good | 45 | 2.5 | 1443 | +8.3 | 7.7 |
| | 42.0 | relaxed** | 47 | 2.3 | 1443 | +8.3 | 7.7 |
| | 76.5 | extensible*** | 46 | 2.1 | 1449 | +8.8 | 7.7 |
| | 79.0 | extensible*** | 45 | 2.5 | 1441 | +8.2 | 8.3 |

*machinability of the dough improved
**the dough becomes stretchy with time, i.e., the gluten properties are improved so that the dough is easier to handle
***elastic, slacker dough Key:
m = amount of added enzyme preparation (mg/kg of flour)
k = dough consistency (subjective assessment)
t = proof time (min) (= time taken by the dough to reach a height of 10 cm in the pan)
h = oven spring (sm) (= difference between the heights of unbacked and final baked loaf)
V = bread volume (ml) determined by rapeseed displacement
V = change (%) in bread volume with respect to control
R = crumb score (from 1 to 10, the greater the value, the better the structure)

It appears from the results that the preparation D, containing cellulose and hemicellulose degrading enzymes and glucose oxidase and sulfhydryl oxidase enzymes, improves the handling properties of the dough (improved relaxation and elasticity) as compared with the comparison preparations, which contain either cellulolytic and/or hemicellulolytic activity (preparations A and B) or glucose oxidase and sulfhydryl oxidase (preparation C). In addition, the bread prepared according to the invention has improved oven spring, volume and texture.

EXAMPLE 2

Preparation of Hearth White Bread

Baking tests were carried out by adding enzyme preparations C and D as described in Example 1 to a bread dough. The enzyme activities and dosage of the tested enzyme preparations were the same as in Example 1. The composition of the dough used was the same as that of the pan bread dough of Example 1, except that it contained less water (55.0% by weight based on the amount of flour). The ingredients were pre-treated similarly as in Example 1, and dough batches of 5,000 g and 2,500 g were prepared for enzyme preparation C and enzyme preparation D, respectively, using the Chorleywood Bread Process. The enzyme solution was dispersed through the dough water, and the water was introduced into a mixing bowl. Then the flour and other dry ingredients were added. The dough was prepared as follows: mixing (Tweedy 35 mixing apparatus, 450 rev/min, scaling, first moulding, first proofing (6 min), second moulding, final proofing at 40° C. (proof times 50, 70 and 90 min) at 70% humidity and baking at 244° C. for 25 min. The loaves were allowed to cool, and they were stored overnight in a closed space at constant temperature (21° C.), whereafter bread volume was determined by rapeseed displacement, and the height and width of the bread were measured. Further, any change in bread volume was determined as compared with the control. The results appear in the following Table 3 set forth below.

TABLE 3

Baking Trials with Enzyme Preparations C and D

| Enzyme prep. | Dosage (mg/kg) | Mixing time(s) | Vol. (ml) + vol. change (%) in rel. to control with different proof times* | | | Height (cm) | | | Width (cm) | | |
|---|---|---|---|---|---|---|---|---|---|---|---|
| | | | 50 | 70 | 90 | 50 | 70 | 90 | 50 | 70 | 90 |
| C | Control | 93 | 1121 | 1110 | 1093 | 8.0 | 7.2 | 6.8 | 10.9 | 11.9 | 12.2 |
| | 0.8 | 102 | 1161 | 1071 | 1222 | 8.2 | 7.5 | 7.3 | 10.7 | 10.7 | 12.3 |
| | | | +3.6 | −3.6 | +11.8 | | | | | | |
| | 2.4 | 96 | 1112 | 1160 | 1214 | 8.5 | 8.6 | 7.3 | 10.3 | 10.5 | 12.5 |
| | | | −0.8 | +4.5 | +11.1 | | | | | | |
| | 4.8 | 101 | 1143 | 1101 | 1244 | 8.2 | 8.1 | 7.8 | 10.4 | 10.4 | 12.1 |
| | | | +2.0 | −0.8 | +13.8 | | | | | | |
| D | Control | 96 | 1164 | 1108 | 1168 | 8.5 | 7.8 | 6.8 | 10.9 | 11.5 | 13.0 |
| | 39.5 | 107 | 1295 | 1482 | 1355 | 7.9 | 7.6 | 6.6 | 11.7 | 12.9 | 13.8 |
| | | | +11.3 | +33.8 | +16.0 | | | | | | |
| | 42.0 | 105 | 1286 | 1509 | 1425 | 7.6 | 8.2 | 6.5 | 11.6 | 12.5 | 13.5 |
| | | | +10.5 | +36.2 | +22.0 | | | | | | |
| | 76.5 | 108 | 1249 | 1508 | 1558 | 7.6 | 8.0 | 7.5 | 11.3 | 12.8 | 13.9 |
| | | | +7.3 | +36.1 | +33.4 | | | | | | |
| | 79.0 | 104 | 1300 | 1505 | 1529 | 7.8 | 8.2 | 9.3 | 12.1 | 12.5 | 13.3 |
| | | | +11.7 | +35.8 | +30.9 | | | | | | |

*Proof times used were 50, 70 and 90 min.

It appears from the results that the effect of the enzyme composition preparation D of the invention on bread volume, for instance, is more favorable than that of the preparation C containing glucose oxidase and sulfhydryl oxidase. In addition, bread prepared according to the invention maintained its shape even with long proof times whereas the control loaves showed a tendency to "flatten out".

EXAMPLE 3

Preparation of White Hearth Bread

Baking trials were carried out to study the replacement of emulsifiers used as "bread improves" and classified as additives with enzyme preparations of the invention containing cellulolytic and/or hemicellulolytic enzyme activity and glucose oxidase. The analysis of the flour used in the baking trials gave the following results: moisture 14.8% (by weight), falling number 262, color 3.7, gluten 26.0%, ash 0.77% (on dry basis), and swelling number 20 (ascorbic acid 15 ppm). The enzyme activities of the enzyme preparation used in Example 3 are shown in Table 4 set forth below.

TABLE 4

Enzyme Preparations Used in Example 3

| Preparation | Dosage mg/kg of flour | Enzyme activity U/kg of flour | | | |
|---|---|---|---|---|---|
| | | Xyl. | CMC | FP | GO |
| 1 | 6 | 100 | 34 | 1.4 | 260 |
| 2 | 10 | 200 | 68 | 2.8 | 260 |
| 3 | 17 | 400 | 136 | 5.6 | 260 |
| 4 | 21 | 500 | 170 | 7.0 | 260 |
| 5 | 8 | 100 | 34 | 1.4 | 530 |
| 6 | 12 | 200 | 68 | 2.8 | 530 |
| 7 | 19 | 400 | 136 | 5.6 | 530 |
| 8 | 23 | 500 | 170 | 7.0 | 530 |
| 9 | 12 | 100 | 34 | 1.4 | 1050 |
| 10 | 23 | 400 | 136 | 5.6 | 1050 |

The bread improver used in the tests contained bread improver base and 8% emulsifier (diacetyl tartaric acid esters of the mono and diglycerides of fatty acids), and its analysis gave the following results:

| | |
|---|---|
| Alpha-amylase | 14 U/g |
| Xylanase | 18 U/g |
| CMC | 5 U/g |
| FP | 2 U/g |
| Ascorbic acid | 0.9 mg/g |
| Fat | 38% by weight |

In this example, the emulsifier of the bread improver (diacetyl tartaric acid esters of the mono and diglycerides of fatty acids) was replaced with the enzyme preparations described above by adding it to the dough together with the improver base.

The baking conditions were as follows:

| (1) | Formula | |
|---|---|---|
| | Wheat flour, medium coarse (g) | 1700 |
| | Yeast (g) | 50 |
| | Salt (g) | 28 |
| | Water (g) | 1000 |
| (2) | Process | |
| | Mixing | 6 min |
| | Dough temperature | 27° C. |
| | Floor time 1 | 45 min |
| | Floor time 2 | — |
| | Scaling weight | 400 g |
| | Transfer into pans | — |
| | Proof | 40–45 min |
| | Baking | 20 min/220° C. |

The amounts of the added enzyme, bread improver and improver base appear from the following Table 5 showing the test results. 1.94% of the improver base was added to all doughs prepared with the enzyme composition of the invention. In each bake, a dough containing 2% of bread improver and a zero dough with no additive were used as a control.

The consistency of the dough was measured by means of a farinograph after kneading and proofing. The farinograph method determines the water intake of a particular flour and the mixing tolerance of the resulting dough. AACC Method 54-21 describes the farinograph method. The loaves were also measured for their height, width, specific volume, and softness.

TABLE 5

| Sample | Bread improver (g/kg) | Improv. base (g/kg) | Dough consistency (FU) after mixing | Dough consistency (FU) after proofing | Bread height/width | Specific bread vol. (1/kg) | Bread softness (penetrometer units) |
|---|---|---|---|---|---|---|---|
| No additives | — | — | 375 | 328 | 54 | 3.85 | 76 |
| Bread improver | 20 | — | 358 | 305 | 59 | 4.64 | 117 |
| 1 | — | 19.4 | — | — | 65 | 4.47 | 102 |
| 2 | — | 19.4 | — | — | 60 | 4.37 | 97 |
| 3 | — | 19.4 | — | — | 58 | 4.39 | 106 |
| 4 | — | 19.4 | — | — | 60 | 4.61 | 111 |
| 5 | — | 19.4 | 390 | 350 | 59 | 4.49 | 109 |
| 6 | — | 19.4 | 410 | 350 | 61 | 4.90 | 116 |
| 7 | — | 19.4 | 400 | 320 | 59 | 5.06 | 120 |
| 8 | — | 19.4 | 400 | 330 | 57 | 4.83 | 113 |
| 9 | — | 19.4 | 380 | 330 | 62 | 4.24 | 102 |
| 10 | — | 19.4 | 380 | 330 | 59 | 4.24 | 93 |

The enzyme compositions appeared to make the dough harder than doughs using the bread improver, and the enzyme compositions increased the mixing resistance of the dough and improved its proof tolerance as compared with dough using the bread improver.

By means of the enzyme composition of the invention, white wheat bread could obtain a specific volume equal to or greater than that obtained by dough using the bread improver. With the enzyme addition, the specific volume of the bread was at best about 9% greater than the specific volume of a corresponding bread containing bread improver and 31% greater than the volume of a product prepared without additives.

Loaves prepared with the enzyme composition of the invention were as soft as or slightly softer than those prepared with the bread improver and markedly softer than those prepared without additives. Loaves prepared with the bread improver showed a tendency to crack at the bottom.

EXAMPLE 4

Bakery Scale Preparation of White Bread

Bakery scale baking tests were carried out by adding to a white bread dough one enzyme composition which contained the three preparations with the enzyme activities set forth in Table 6 below. The flour was prepared in accordance with Example 3 and exhibits the same qualities.

TABLE 6

| Enzyme preparation | Dosage mg/kg of flour | Xyl. | FP | CMC | GO | SHX |
|---|---|---|---|---|---|---|
| 1. Cellulase/hemicellulase | 6.5 | 175 | 3 | 60 | | |
| 2. Fungal alpha-amylase ("Sal-Conc. 90 000", manuf. Shin Nihon, Japn | 5 | | | | | |
| 3. Glucose oxidase/sulphydryl oxidase | 4 | | | | 500 | 2 |

Prior to baking, the enzyme composition was mixed with a small amount of wheat flour to form a so-called baking pre-mixture. This pre-mixture was added at the beginning of dough mixing in such an amount that the enzymes were added at the dosages given in Table 6 per kg of flour. With this dosage, a white bread dough and a French bread dough were prepared. During the baking, the pre-mixture containing the enzyme additions was mixed with the flour prior to the addition of water.

The carrier in the pre-mixture can also consist of other ingredients than white flour, such as other flour, dry milk, sugar, fat or a mixture containing these ingredients. The possible carrier may also be a baking additive (such as an emulsifier) or an additive mixture containing baking ingredients and additives.

In addition to a normal baking test, a so-called retarded baking test was carried out on the French bread dough, in which a dough piece in the form of a long loaf was kept in a refrigerator for 18 h, and the product was baked in the morning following the dough preparation. White bread was prepared using the straight dough process.

The ingredients and baking conditions were as follows:

(1) Formula (amounts (g) calculated per one liquid liter of the dough)

| | French bread | White bread |
|---|---|---|
| Wheat Flour | 1740 | see long loaf formula (no vegetable oil) |
| Gluten | 13 | |
| Yeast | 100 | |
| Salt | 28 | |
| Water | 1,000 | |
| Lecimax 2000 | 28 | |
| Vegetable oil | 19 | |
| | 2928 | |

(2) Process

| | French Bread | White bread |
|---|---|---|
| Mixing (min) | 17 | 12 (DIOSNA) |
| Temperature (°C.) | 23 | 27 |
| Floor time (min) | 2–3 | approx. 30 |
| Molding | First molding | First molding (BENIER) |
| Floor time (min) | 10 | 10 |
| Final molding | Glimek | Glimek |

| | French Bread | White bread |
|---|---|---|
| Refrigerator (h) | 18 (part into direct baking) | direct baking |
| Proof (°C., %) | 32 | 30, 60%, 61 min |
| Baking | Stick oven (RADIONAL) | rotary grate 25 min (WERNER & PFLEIDERER) |

In baking trials with the enzyme additions, gluten and Lecimax 2000 were replaced with the enzyme-flour pre-mixture described above.

The baking results are set forth in Table 7 below.

TABLE 7
Results of Baking Scale Preparation of White Breads

| | Volume (ml) | | |
|---|---|---|---|
| Product | normal baking | retarded baking | Softness (one day) |
| FRENCH BREAD | | | |
| Normal formula | 1080 | 1060 | |
| Enzyme comp. | 1250 | 1053 | |
| Difference % | (+16) | (0) | |
| WHITE BREAD | | | |
| Normal formula | 1855 | | 126 |
| Enzyme comp. | 1880 | | 108 |
| Difference % | (+1.5) | | (−17) |

The sensory evaluation of the French bread and white bread baked in accordance with this Example was as follows:

| | Control | Formula Using Enzymes |
|---|---|---|
| Dough after mixing | Rather weak | Velvety, strong |
| Dough handling properties | Slightly sticky | Dry surface, good machinability |
| Process tolerance of dough | Weak dough after proofing | Maintains well round profile at different process stages |
| Crust | Uneven texture and color, flattish shape | Crust very uniform, round shape |
| Bread crumb | Slightly open grain | Uniform |

The results also from the bakery-scale test bake show that the white dough prepared with the addition of the enzyme composition was softer and more velvety after mixing than the dough prepared with the emulsifier and gluten addition. During molding, the surface of the dough felt drier, which improved its machinability. During and after proofing, the dough pieces made of the dough with the enzyme additions had a greater height and exhibited a markedly better proof tolerance than the dough pieces made of the dough with the emulsifier and gluten addition. Differences observed during the baking process in the properties of the doughs manifested themselves in the final bakery products as improved appearance, i.e., the white bread and the French bread prepared with the enzyme additions had a more uniform surface and were more regularly round in shape. The test bake showed that by means of the enzyme composition the processability of the doughs could be improved and the final product had improved appearance and better crumb texture as compared with the bake using an emulsifier and gluten addition.

EXAMPLE 5

Replacement of Non-Specific Oxidants with Enzyme Preparations

Baking tests were carried out so as to find out whether it was possible to replace the bromate and/or diacetyl tartaric acid esters of the mono- and diglycerides of fatty acids (DATA esters) used as additive in baking with the enzyme composition of the invention in combination with lecithin. The following combinations (enzyme composition/lecithin) were used in the tests:

| | Combination A | Combination B |
|---|---|---|
| GO | 2.5 mg/kg | 2.5 mg/kg |
| Cell./Hemicell. | 25 mg/kg | 35 mg/kg |
| Fungal protease ("Fungal protease", manuf. Biocon, Ireland) | 30 mg/kg | 30 mg/kg |
| Lecithin (Emulpur N) | 0.4% | 0.4% |

The amount of the added enzyme composition is given in mg per kg of flour and the amount of added lecithin is % by weight, based on flour.

The amounts of added cellulolytic and hemicellulolytic enzymes and glucose oxidase as enzyme activities per kg of flour were as follows:

| | Added enzyme activities U/kg | | | |
|---|---|---|---|---|
| | Xyl. | FP | CMC | GO |
| Combination A | 675 | 9.5 | 233 | 263 |
| Combination B | 945 | 13.3 | 326 | 263 |

In the test bakes, white pan bread was prepared using the Chorleywood Bread Process. The ingredients and baking conditions were as follows:

Basic formula:

| | % by weight on the weight of flour |
|---|---|
| Flour | 100 |
| Compressed yeast | 2.5 |
| Salt | 1.8 |
| Water - determ. with a 10 min extrusion method | 57.5 g |
| Fat | 0.7 |
| Ascorbic acid | 0.003 |
| Potassium bromate | 0.0045 |

The alpha-amylase activity of the flour adjusted to 83 FU by adding fungal alpha-amylase.

The parameters of the baking process were as follows:

| Mixing machine | Tweedy '35' |
|---|---|
| Mixing efficiency | 11 Wh/kg |
| Pressure | Atmospheric |
| Dough temperature | 30.5 1° C. |
| Scaling | Manually into 908 g |
| First molding | Into a ball with a conical molder |
| First proof | 6 min at room temp. |
| Final molding | "Four-piece" technique (R 9, W 15.5, P 0.25) |
| Pan size | 250 mm × 122 mm, height 125 mm |
| Shape | Lidded |
| Proof conditions | 43° C., suitable humidity to prevent skinning |
| Proof height | 11 cm |

|   |   |
|---|---|
| Baking temperature | 244° C. |
| Type of oven | Gas-fired oven |
| Baking time | 30 min |
| Baking humidity | No steam injection |

With the formula described above; (1) a basic dough, (2) a basic dough without bromate, (3) a basic dough without bromate and DATA ester, (4) a basic dough without bromate and DATA ester but with the addition of the combination A of the enzyme composition of the invention and lecithin, and (5) a basic dough without bromate and DATA ester but with the addition of the combination B of the enzyme composition of the invention and lecithin were prepared. 5,000 g of the flour was used in each dough batch.

No substantial differences were observed in the consistencies of the different doughs. The doughs were measured for the required mixing time (i.e., time required for the dough to consume 11 Wh/kg) and proof time, and the finished product for its loaf volume, Hunterlab Y-value (descriptive of the crumb color, the higher Y-value, the lighter the crumb color), and the crumb score. The results are shown in Table 8.

TABLE 8

Baking Trials With and Without Non-Specific Oxidants

|   | Mixing time (s) | Proof time (min) | Loaf volume (ml) | Hunter-lab Y-value | Crumb score (m. 10) |
|---|---|---|---|---|---|
| (1) Basic dough | 120 | 51 | 3013 | 54.1 | 8.0 |
| (2) Basic Dough With No bromate | 124 | 48 | 2914 | 53.5 | 5.5 |
| (3) Basic Dough With No bromate; no DATA ester | 123 | 50 | 2594 | 50.5 | 2.0 |
| (4) Basic Dough With No bromate, no DATA ester + Combination A | 140 | 50 | 2925 | 49.3 | 4.0 |
| (5) Basic Dough With No bromate; no DATA ester + Combination B | 131 | 50 | 2953 | 51.2 | 5.0 |

The proof time was of the same order for all doughs (with the exception of dough (2). As compared with the basic dough, the mixing time increased to some extend when the enzyme composition of the invention and lecithin were added to the dough. The addition of the enzyme composition and lecithin increased the loaf volume as compared with a product which did not contain bromate or DATA ester. No substantial differences were found in the crumb color when comparing the product containing the enzyme composition of the invention and lecithin with a product prepared from the basic dough, which did not contain bromate and DATA ester. The crumb score was substantially better with the products (4) and (5) of the invention than with the product (3), which did not contain bromate and DATA ester. In sum, it appears that the replacement of bromate and DATA ester with the enzyme composition of the invention and lecithin resulted in a marked improvement over products prepared from the basic dough containing no bromate and no DATA ester.

EXAMPLE 6

Baking Trials Using Sponge and Dough Technique: With and Without Non-Specific Oxidants Corresponding test bakes as above in Example 5 were carried out for replacing bromate and monoglycerides with the enzyme composition of the invention and lecithin except that the Sponge and Dough technique was used as a baking process. The following combinations were used in the tests:

Combination

|   | Combination | | |
|---|---|---|---|
|   | C | D | E |
| Glucose Oxidase | 1.0 mg/kg | 2 mg/kg | 3 mg/kg |
| Cell./hemicell. | 15 mg/kg | 15 mg/kg | 30 mg/kg |
| Fungal protease ("Fungal Protease", manuf. Biocon Ireland) | 45 mg/kg | 45 mg/kg | 30 mg/kg |
| Fungal alpha-amyl. ("Sal-Conc 90 000", manuf. Shin Nihon, Japan) | 5 mg/kg | 5 mg/kg | 5 mg/kg |
| Lecithin, (Emulpur N) | 0.4% | 0.4% | 0.4% |

The added amounts of the cellulolytic and hemicellulolytic enzymes and glucose oxidase as enzyme activities per kg of flour were as follows:

Added enzyme activities U/kg

|   | Added enzyme activities U/Kg | | | |
|---|---|---|---|---|
|   | Xyl. | FP | CMC | GO |
| Combination C | 405 | 5.7 | 140 | 105 |
| Combination D | 405 | 5.7 | 140 | 210 |
| Combination E | 810 | 11.4 | 280 | 315 |

Ingredients and baking conditions used in the baking tests were as follows:

White pan bread, preparation of basic dough

| Batch size | | |
|---|---|---|
| (g) | (g) | Ingredients |
|   |   | Sponge |
| 700 | 2100 | White flour (protein content 11.72% determined per 14% moisture) "Arkady (RKD)" mineral yeast food, manuf. Cainfood Ind.; 2.8 g of |
| 3 | 9 | bromate/kg |
| 25 | 75 | Compressed yeast |
| 420 | 1260 | Water |
|   |   | Dough |
| 300 | 900 | White flour (protein content 11.72% determined per 14% flour moisture) |
| 60 | 180 | Sugar |
| 20 | 60 | Nonfat dry milk |
| 20 | 60 | Salt |
| 5 | 15 | Bread softener (monoglycerides) |
| 30 | 90 | All-purpose shortening |
| 180 | 540 | Water |
| 1763 | 5289 | Total dough weight |
|   |   | Process |
|   |   | Hobert A-200 mixer |
|   |   | McDuffee 20 qt. dough bowl |
|   |   | Sponge: |
| 24–25 | 24–25 | temperature (°C.) |
| 3.25 | 3.75 | fermentation time (h) at 29° C. |

-continued

|  |  | Dough: |
|---|---|---|
| 25.5–26.5 | 25.5–26.5 | Temperature (°C.) |
| 5 | 9 | Mixing time (min) with med. speed |
| 10 | 10 | Floor time (min) |
| 526 | 526 | Scaling weight (g) |
| 100 1 mm | 100 1 mm | Average proof height |
| 16 | 16 | Baking time (min) at about 230° C. |
| 1 | 1 | Cooling time at room temperature (h) |

The baking test results are given in Tables 9–12.

TABLE 9

| Bread qualities | Max score | Basic dough | 0.5% "GMS-90"* | 1 % C | 1 % D |
|---|---|---|---|---|---|
| External qualities: | 30 | | | | |
| Volume | 10 | 8.5 | 9 | 9.25 | 9.5 |
| Symmetry | 5 | 4.75 | 4.5 | 4.5 | 4.25 |
| Crust color | 10 | 8 | 8 | 8 | 8 |
| "Break & Shred" | 5 | 4.75 | 4.5 | 4.5 | 4.25 |
| Internal qualities: | 70 | | | | |
| Grain | 100 | 8 | 8 | 8 | 8 |
| Texture | 15 | 13.25 | 13.25 | 13.25 | 13 |
| Color | 10 | 9 | 9 | 9 | 9 |
| Aroma | 10 | 9 | 9 | 9 | 9 |
| Taste | 15 | 13 | 13 | 13 | 13 |
| Mouth Feel | 10 | 9 | 9 | 9 | 9 |
| Total score | 100 | 87.25 | 87.25 | 87.5 | 87 |
| Proof height (mm) | | 100 | 99.3 | 100.3 | 100.3 |
| Proof time (min) | | 61 | 60 | 65 | 58 |
| Specific volume (cm³/g) | | 5.50 | 5.60 | 5.65 | 5.70 |
| Crumb softness (3 days) | | 318 6 | 274 5 | 254 5 | 288 6 |
| Dough consistency | | | | more relaxed at molder** | slightly softer at mixer |

*crumb softener, manuf. Breddo, USA, contains 21% of monoglycerides, whereby 0.5% GMS-90 is equivalent to an addition of 1.05 g of monoglycerides per kg of flour
**see Table 2

TABLE 10

| | | 0.3% Arkady (RKD)* 0.5% GMS-90** | | No Arkady (RKD) 0.5% GMS-90** | | No Arkady (RKD) No GMS-90 1 % C | | No Arkady (RKD) No GMS-90 1 % D | |
|---|---|---|---|---|---|---|---|---|---|
| Bread qualities | Max score | Control | 20 sec vib. | Control | 20 sec vib. | Control | 20 sec vib. | Control | 20 sec vib. |
| External qualities: | 30 | | | | | | | | |
| Volume | 10 | 8.75 | 6.5 | 8.5 | 1.25 | 9 | 2.25 | 8.25 | 4 |
| Symmetry | 5 | 4.25 | 3.75 | 4 | 1.5 | 4 | 1.75 | 4 | 2.75 |
| Crust color | 10 | 8 | 7 | 8 | 5 | 8 | 5 | 8 | 5.5 |
| "Break & Shred" | 5 | 4.25 | 4 | 4 | 1 | 4.25 | 1.5 | 4.25 | 2 |
| Internal qualities: | 70 | | | | | | | | |
| Grain | 10 | 8 | 7.25 | 6 | 5.75 | 6.75 | 5.75 | 6.75 | 6.25 |
| Texture | 15 | 13 | 12 | 11 | 10.5 | 11.5 | 11.25 | 11.5 | 11.5 |
| Color | 10 | 9 | 8.75 | 8.5 | 8.25 | 8.5 | 8.25 | 8.5 | 8.5 |
| Aroma | 10 | 8.75 | 8.75 | 9 | 9 | 8.75 | 8.75 | 8.75 | 8.5 |
| Taste | 15 | 12.75 | 12.75 | 12.75 | 12.75 | 12.75 | 12.75 | 12.75 | 12.75 |
| Mouth feel | 10 | 9 | 9 | 8.75 | 8.75 | 8.75 | 8.75 | 9 | 8.75 |
| Total score | 100 | 85.75 | 79.75 | 80.5 | 63.75 | 82.25 | 66 | 81.75 | 70.5 |
| Proof height (mm) | | 99.9 | 99.3 | 100.7 | 100.3 | 100.3 | 100.3 | 100 | 100 |
| Proof time (min) | | 56 | | 65 | | 65 | | 64 | |
| Specific volume (cm3/g) | | 5.38 | 4.91 | 5.31 | 3.86 | 5.42 | 4.06 | 5.28 | 4.41 |
| Crumb softness (1 day) | | 171 ± 1 | | 201 ± 3 | | 174 ± 3 | | 167 ± 2 | |
| Crumb softness (5 days) | | 335 ± 4 | | 352 ± 8 | | 349 ± 6 | | 334 ± 4 | |

*equivalent to 8.4 ppm of bromate
**equivalent to 1.05 g of monoglycerides/kg of flour Crumb softness (given in the tables) has been defined using the AACC standard method 74–09 (force required to compress two slices of bread (25 mm) with a 36 mm diameter flat disk plunger by 6.2 mm (24%) at a compression rate of 100 mm/min); the smaller the value, the softer the product.

TABLE 11

| | | 0.3% Arkady (RKD)* in sponge 0.5% GMS-90** | | 0.3% Arkady (RKD)* added to dough 0.5% GMS-90** | | 1 % E No GMS-90 | |
|---|---|---|---|---|---|---|---|
| Bread qualities | Max score | Control | 20 sec vib. | Control | 20 sec vib. | Control | 20 sec vib. |
| External qualities: | 30 | | | | | | |
| Volume | 10 | 9.25 | 7.5 | 9.25 | 4.5 | 9 | 5 |
| Symmetry | 5 | 4.25 | 4 | 4.25 | 3.5 | 4.25 | 3.5 |
| Crust color | 10 | 8 | 7.5 | 8 | 6.5 | 8 | 6.5 |
| Break & Shred | 5 | 4.5 | 4 | 4.5 | 3.75 | 4.75 | 3.5 |
| Internal qualities: | 70 | | | | | | |
| Grain | 10 | 8 | 7.75 | 7.5 | 7.5 | 7.5 | 7.5 |
| Texture | 15 | 13 | 12.5 | 12.5 | 12.5 | 13 | 12.25 |
| Crumb color | 10 | 9 | 9 | 9 | 9 | 8.75 | 8.75 |
| Aroma | 10 | 9 | 9 | 8.75 | 8.75 | 9 | 9 |
| Taste | 15 | 13 | 13 | 13 | 13 | 13 | 13 |
| Mouth feel | 100 | 9 | 9 | 9 | 9 | 9 | 9 |
| Total score | | 87 | 83.25 | 85.75 | 78 | 86.25 | 78 |
| Proof height (mm) | | 99.4 | 99.3 | 100 | 100 | 99.9 | 100 |
| Proof | | 58 | | 62 | | 63 | |

TABLE 11-continued

| Bread qualities | Max score | 0.3% Arkady (RKD)* in sponge 0.5% GMS-90** | | 0.3% Arkady (RKD)* added to dough 0.5% GMS-90** | | 1 % E No GMS-90 | |
|---|---|---|---|---|---|---|---|
| | | Con-trol | 20 sec vib. | Con-trol | 20 sec vib. | Con-trol | 20 sec vib. |
| time (min) | | | | | | | |
| Specific volume (cm3/g) | | 5.49 | 5.10 | 5.47 | 4.51 | 5.41 | 4.63 |

*equivalent to 8.4 ppm of bromate
**equivalent to 1.05 g of monoglycerides/kg of flour

TABLE 12

| Formulation | | | Crumb softness | |
|---|---|---|---|---|
| Arkady (RK) % | GMS-90 % | Combination of to the invention | Bread age | |
| | | | 1 day | 5 days |
| 0.3* | 0.5** | — | 171 1 | 335 4 |
| — | 0.5** | — | 201 3 | 352 8 |
| — | — | 134 | 174 3 | 349 6 |
| — | — | 136 | 167 2 | 334 4 |
| 0.3* | 0.5** | — | 147 4 | 294 5 |
| 0.3a* | 0.5** | — | 145 4 | 293 7 |
| — | — | 143 | 146 3 | 308 5 | a bromate added to dough instead of sponge
*equivalent to 8.4 ppm of bromate
**equivalent to 1.05 g of monoglycerides per kg of flour Table 9 gives results from baking tests on the replacement of an emulsifier (monoglycerides) with the enzyme preparation of the instant invention. Monoglycerides (bread softener GMS-90) or combinations C and D were added to the basic dough (containing bromate (Arkady (RKD)) added in the sponge). It appears from the table that the enzyme composition of the invention in combination with lecithin can replace monoglycerides used as emulsifier (cf. the total score obtained by the breads). The loaf volume increased slightly when using the combination of the invention as compared with bread made from the basic dough alone, and the other properties were substantially of the same order. In addition, the use of the combination of the invention gave slightly softer bread as compared with bread made from the basic dough with the addition of monoglycerides.

Table 10 shows results from baking tests carried out for studying the replacement of bromate with the combinations C and D of the invention. The first dough contained 8.4 ppm of bromate (0.3% Arkady (RKD)) added to the sponge, and 0.11% of monoglycerides (0.5% GMS-90). The second dough contained 0.11% of monoglycerides (0.5% GMS-90) but no bromate. The third dough contained the combination C of the invention without bromate and monoglycerides. Finally, the fourth dough contained the combination D of the invention, similarly without bromate and monoglycerides. In addition, each dough underwent a vibration test of 20 seconds for the assessment of the strength of the dough.

When the combination C of the invention was used, the loaf volume obtained was as good as that obtained with the control containing bromate. No major deficiencies were observed in the external properties of the loaf when bromate was omitted. The proof time, however, was slightly longer with doughs prepared without bromate. As to the test results from the vibration test, the combination D in particular was able to eliminate the negative effects of vibration.

Table 11 shows the results from baking tests carried out for studying the replacement of bromate with the combination E of the invention. Three doughs were prepared of which the first dough contained 8.4 ppm of bromate (0.3 Arkady (RKD)) added to the sponge, and 0.11% of monoglycerides (0.5% GMS-90); the second dough contained 8.4 ppm of bromate (0.3% Arkady (RKD)) added to the dough, and 0.11% of monoglycerides (0.5% GMS-90); and the third dough contained the combination E of the invention without bromate and monoglycerides. It appears from the results that the dough prepared by means of the combination of the invention behaved substantially similarly as the control dough, in which the bromate had been added to the dough instead of the sponge.

Table 12 shows the results from baking tests carried out for comparing the effect of monoglycerides (possibly in combination with bromate) and that of the combinations C, D and E of the invention on the crumb softness when the product was stored. It appears from the results that the combinations C and D of the invention affected the crumb softness as favorably as monoglycerides conventionally used for the purpose (with five days old loaves). The stage at which bromate was added did not affect the ageing of the bread. Bread made with the combination E of the invention was slightly softer than the control after storage for five days.

EXAMPLE 7

Baking Trials with Enzyme Preparations in Combination with Lecithin

A test bake was carried out for studying further the effects of a simultaneous addition of the enzyme composition optimized for baking purposes and lecithin on white baking. Previous tests have not shown that the use of this enzyme composition could increase the process resistance and loaf volume and improve the antistaling properties of the product, for instance. It was the object of the test to find out whether lecithin in combination with the enzyme composition could further improve the baking properties of white dough so the qualitatively better bakery products could be obtained.

The product to be baked was a white roll. the qualitative properties of the white flour used in the bake were as follows:

| | |
|---|---|
| Protein content (dry substance) | 10.9% (d.s.) |
| Ash content (by weight) | 0.79% |
| Falling number | 292 |
| Amylogram | 230 B.U./79° C. |
| Add. of ascorbic acid | 15 ppm |

The test bake was carried out with the following formula and process parameters:

Basic formula:

| | |
|---|---|
| White flour | 1,000 g |
| Yeast | 35 g |
| Salt | 20 g |
| Sugar | 20 g |
| Water | 620 g |
| Total | 1,695 g |

Process:

| | |
|---|---|
| Dough mixing | 5 min (Kemper spiral mixer, speed 2) |
| Dough temperature | 27° C. |
| Scaling and first molding | 60 g (Rekord Teiler) |
| First proof time | 10 min |
| Proofing | 40 min/75% rH, 35° C. |

-continued

| Baking time | 18 min/220° C. |
|---|---|

The following doughs were prepared: (2) a basic dough with the basic formula, (2) a basic dough with the addition of lecithin, (3) a basic dough with the enzyme addition according to the invention, and (4) a basic dough with the addition of lecithin and enzyme.

The added lecithin and enzyme amounts in doughs (2), (3) and (4) were as follows:

|  | (2) | (3) | (4) |
|---|---|---|---|
| GO | — | 1 mg/kg | 1 mg/kg |
| Cell./hemicell: | — | 15 mg/kg | 15 mg/kg |
| Fungal protease ("Fungal protease", manuf. Biocon, Ireland) | — | 45 mg/kg | 45 mg/kg |
| Fungal alpha-amylase ("Sal-Conc. 90 000", manuf. Shin Nihon, Japan) | — | 5 mg/kg | 5 mg/kg |
| Lecithin (Emulpur N) | 0.4% | — | 0.4% |

The amounts of added enzymes is given in mg per kg of flour and the amount of added lecithin in % by weight on flour.

The added amount of cellulolytic and hemicellulolytic enzymes and glucose oxidase as enzyme activities per kg of flour were as follows:

|  | Added enzyme activities U/kg | | | |
|---|---|---|---|---|
|  | Xyl. | FP | CMC | GO |
| Flours (3) and (4) | 405 | 5.7 | 140 | 105 |

The results are shown in the following table:

| Product properties | Baking series | | | |
|---|---|---|---|---|
|  | (1) | (2) | (3) | (4) |
| Weight (g) | 45 | 45 | 48 | 47 |
| Height (mm) | 46 | 48 | 50 | 48 |
| Width (mm) | 77 | 82 | 78 | 80 |
| Volume (ml/prod.) | 153 | 164 | 177 | 182 |
| Specific volume (cm$^3$/g) | 3.4 | 3.6 | 3.7 | 3.9 |
| Sensory evaluation (texture/crumb properties) | satisf. | good | good | excellent |

The results show that the mere addition of lecithin or an enzyme composition useful in baking improves the final product. Both additions increase the roll volume by 5-10% on average. As to the crumb texture, marked differences can be found between products prepared with an addition of lecithin and enzymes, respectively. Lecithin gives a more even grain structure with smaller pores as compared with the enzyme composition. The addition of lecithin gives the dough a rather slack, slightly sticky texture, whereas the enzyme mixture strengthens the dough giving good handling properties. Simultaneous use of lecithin and the enzyme composition in baking clearly affects favorably the baking properties. The elastic dough has improved handling and process properties. The grain structure of the final product is more uniform and softer as compared with products prepared with a mere addition of lecithin or enzymes. In addition, the external properties of the product are more even (crust texture). The simultaneous use of lecithin and the enzyme composition simultaneously increases the bread volume by about 15% as compared with a product prepared without any additions.

Preliminary experiments have demonstrated that the enzyme composition of the invention with or without lecithin works also in doughs where higher amounts of fat and/or sugar and/or spices are present, such as in doughs for sweet goods, like cakes.

The effective amount of cellulose and hemicellulose degrading enzymes is mutually dependent on the level of each other. The levels may also be dependent on the microbial source used in enzyme production. Furthermore, the effective amount of cellulose and hemicellulose (specified as xylen) degrading enzymes may also be dependent on the levels of other hemicellulose degrading enzyme activities.

Foregoing general discussion and experimental examples are intended to be illustrative of the present invention, and are not to be considered as limiting. Other variations within the spirit and scope of this invention are possible and will present themselves to those skilled in the art.

We claim:

1. A method for improving rheological properties of a flour dough and the quality of the baked product produced therefrom which comprises combining flour, yeast and water with an effective amount of an enzyme preparation comprising hemicellulose and/or cellulose degrading enzymes and glucose oxidase and mixing said ingredients to form a suitable baking dough.

2. The method of claim 1 wherein said enzyme preparation includes sulfhydryl oxidase.

3. The method of claim 1 wherein said enzyme preparation is added in an amount of about 0 to about 50,000 Units of a hemicellulose degrading enzyme, about 0 to about 50,000 Units of cellulase and about 5 to about 2,500 Units of glucose oxidase per kilogram of flour.

4. The method of claim 3 wherein said enzyme preparation is added in an amount of about 10 to about 10,000 Units of a hemicellulose degrading enzyme, about 10 to about 10,000 Units of cellulase and about 35 to about 1,000 Units of glucose oxidase per kilogram of flour.

5. The method in accordance with claim 2 wherein said enzyme preparation is added in an amount of about 0 to about 50,000 Units of a hemicellulose degrading enzyme, about 0 to about 50,000 Units of cellulase, about 5 to about 2,500 Units of glucose oxidase and about 0 to about 800 Units of sulfhydryl oxidase per kilogram of flour.

6. The method in accordance with claim 5 wherein said enzyme preparation is added in amount of about 10 to about 10,000 Units of a hemicellulose degrading enzyme, about 10 to about 10,000 Units of cellulase, about 35 to about 1,000 Units of glucose oxidase and about 0 to about 300 Units of sulfhydryl oxidase per kilogram of flour.

7. The method in accordance with claim 1 wherein said dough is prepared by means of a straight dough process.

8. The method in accordance with claim 1 wherein said dough is prepared by means of a sour dough process.

9. The method in accordance with claim 1 wherein said dough is prepared by means of the Chorleywood bread process.

10. The method in accordance with claim 1 wherein said dough is prepared by means of the Sponge and Dough process.

11. The method in accordance with claim 1 wherein said final baked product is a bread.

12. The method in accordance with claim 1 wherein said final baked product contains sweetening or sweetening agents.

13. The method in accordance with claim 1 wherein lecithin is added to said enzyme preparation.

14. The method in accordance with claim 13 wherein said lecithin is added in an amount between about 0.1% to about 1.1% by weight.

15. The method of claim 13 wherein said lecithin is added in an amount of about 0.2% to about 0.8% by weight.

16. A method for improving the rheological properties of a flour dough which comprises combining flour with an effective amount of an enzyme preparation comprising hemicellulose and/or cellulose degrading enzymes and glucose oxidase and a suitable carrier to form a dough premix.

17. The method in accordance with claim 16 wherein said enzyme mixture includes sulfhydryl oxidase.

18. The method in accordance with claim 16 wherein said premix includes lecithin.

19. An enzyme preparation which improves the rheological properties of dough and the characteristics of a baked product made therefrom which comprises hemicellulose and/or cellulose degrading enzymes and glucose oxidase.

20. The enzyme preparation in accordance with claim 19 wherein said enzyme preparation includes sulfhydryl oxidase.

* * * * *